(12) United States Patent
Muramoto et al.

(10) Patent No.: US 10,370,821 B2
(45) Date of Patent: Aug. 6, 2019

(54) WORK VEHICLE

(71) Applicant: KOMATSU LTD., Tokyo (JP)

(72) Inventors: Kenichi Muramoto, Komatsu (JP); Yasunari Kato, Komatsu (JP); Yuuki Shimasaki, Komatsu (JP); Jun Itou, Komatsu (JP); Masahiko Hamaguchi, Nomi (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/555,724

(22) PCT Filed: Oct. 30, 2015

(86) PCT No.: PCT/JP2015/080678
§ 371 (c)(1),
(2) Date: Sep. 5, 2017

(87) PCT Pub. No.: WO2017/072937
PCT Pub. Date: May 4, 2017

(65) Prior Publication Data
US 2018/0058037 A1 Mar. 1, 2018

(51) Int. Cl.
*E02F 9/16* (2006.01)
*B60R 7/04* (2006.01)
(Continued)

(52) U.S. Cl.
CPC .............. *E02F 9/16* (2013.01); *B60N 2/24* (2013.01); *B60N 2/753* (2018.02); *B60N 2/797* (2018.02);
(Continued)

(58) Field of Classification Search
CPC ............. E02F 9/16; B60R 7/04; B66C 13/54
(Continued)

(56) References Cited

U.S. PATENT DOCUMENTS 4,478,308 A * 10/1984 Klaassen ............... B60K 26/00
180/326
5,052,512 A * 10/1991 Pakosh ................. B60N 2/143
180/329
(Continued)

FOREIGN PATENT DOCUMENTS

CN 1986978 A 6/2007
CN 101936019 A 1/2011
(Continued)

OTHER PUBLICATIONS

The International Search Report for the corresponding international application No. PCT/JP2015/080678, dated Jan. 24, 2017.
(Continued)

*Primary Examiner* — Faye M Fleming
(74) *Attorney, Agent, or Firm* — Global IP Counselors, LLP (57) ABSTRACT

A work vehicle includes a console box disposed to a side of an operator's seat, and a support including a rotational axis disposed in a left and right direction below the console box. The console box is configured to be rotatable in a forth and back direction. The support rotatably supports the console box around the rotational axis and between an operating position in which the console box is horizontally disposed and a retracted position in which the console box is inclined at a position in which the console box has been rotated rearward from the operating position. A spacing in a horizontal direction between front and rear ends of the console box disposed in the retracted position is less than a spacing in the horizontal direction between front and rear ends of the console box disposed in the operating position.

6 Claims, 9 Drawing Sheets

(51) Int. Cl.
*E02F 9/20* (2006.01)
*B62D 1/18* (2006.01)
*B62D 1/22* (2006.01)
*B62D 12/00* (2006.01)
*B60N 2/24* (2006.01)
*B60N 2/75* (2018.01)
*F16G 13/16* (2006.01)

(52) U.S. Cl.
CPC ............... *B60R 7/04* (2013.01); *B62D 1/18* (2013.01); *B62D 1/22* (2013.01); *B62D 12/00* (2013.01); *E02F 9/2004* (2013.01); *F16G 13/16* (2013.01)

(58) Field of Classification Search
USPC .......................................... 180/89.13, 89.14
See application file for complete search history.

(56) References Cited

U.S. PATENT DOCUMENTS

| | | | |
|---|---|---|---|
| 9,434,340 | B2 * | 9/2016 | Egusa ..................... B60R 7/04 |
| 2006/0232116 | A1 | 10/2006 | Jang et al. |
| 2008/0035401 | A1 | 2/2008 | Ishii et al. |
| 2014/0217700 | A1 | 8/2014 | Ushikubo et al. |
| 2014/0367534 | A1 | 12/2014 | Sakatani et al. |
| 2018/0112374 | A1 * | 4/2018 | Kato ..................... E02F 9/0841 |
| 2018/0230675 | A1 * | 8/2018 | Kato ....................... B60R 7/04 |

FOREIGN PATENT DOCUMENTS

| | | |
|---|---|---|
| EP | 1 693 522 A2 | 8/2006 |
| EP | 2 682 530 A1 | 1/2014 |
| EP | 2 813 625 A1 | 12/2014 |
| JP | 6-24048 U | 3/1994 |
| JP | 6-82160 U | 11/1994 |
| JP | 9-13425 A | 1/1997 |
| JP | 9-273178 A | 10/1997 |
| JP | 2000-54434 A | 2/2000 |
| JP | 2000-179005 A | 6/2000 |
| JP | 2000179005 A * | 6/2000 |
| JP | 2002-19530 A | 1/2002 |
| JP | 2006-77544 A | 3/2006 |
| JP | 2007-100788 A | 4/2007 |
| JP | 2010-127054 A | 6/2010 |
| JP | 2012-127137 A | 7/2012 |
| WO | 2013/045034 A1 | 4/2013 |

OTHER PUBLICATIONS

The extended European search report for the corresponding European application No. 15907301.4, dated Feb. 21, 2019.

The partial supplementary European search report for the corresponding European application No. 15907301.4, dated Oct. 15, 2018.

The Office Action of the corresponding Chinese application No. 201580077475.3, dated Jun. 17, 2019.

* cited by examiner

WORK VEHICLE

CROSS-REFERENCE TO RELATED APPLICATIONS

This application is a U.S. National stage application of International Application No. PCT/JP2015/080678, filed on Oct. 30, 2015.

BACKGROUND

Field of the Invention

The present invention relates to a work vehicle.

Description of the Related Art

In a work vehicle such as a wheel loader or a hydraulic excavator, a configuration has been disclosed in which a console box is disposed to the side of the operator's seat, and an operating lever is provided to the console box (see 2012-127137, for example).

With the hydraulic excavator disclosed in 2012-127137, in a state in which a gate lock lever is disposed in a locked position, the console box is positioned on the front side, and in a state in which the gate lock lever is disposed in an open position, the console box is positioned on the rear side.

The operator gets in and out of the vehicle with the console box moved to the rear side.

SUMMARY

However, since the distance the console box moves is short, there are times when the console box gets in the way, making difficult for the operator to get in and out of the vehicle.

It is also possible to slide the console box far to the rear to facilitate operator ingress and egress, but if the inner wall of the cab is located just behind the operator's seat, the console box can be slid back only a small amount, so it is still difficult for the operator to get in and out.

In light of the problems encountered with conventional work vehicles, it is an object of the present invention to provide a work vehicle that is easier to get in and out of.

The work vehicle pertaining to the first aspect comprises a console box and a support. The console box is disposed to the side of an operator's seat and is configured to be rotatable in the forth and back direction. The support has a rotational axis disposed in the left and right direction below the console box, and rotatably supports the console box around the rotational axis and between an operating position in which the console box is horizontally disposed and a retracted position in which the console box is inclined at a position where the console box has been rotated rearward from the operating position. The spacing in the horizontal direction between the front and rear ends of the console box disposed in the retracted position is less than the spacing in the horizontal direction between the front and rear ends of the console box disposed in the operating position.

Thus rotating the console box rearward so that the spacing in the horizontal direction between the front and rear ends of the console box becomes shorter in the retracted position than in the operating position allows the front end of the console box to move far to the rear. Accordingly, it is easy for the operator to get in and out of the vehicle even though the door is to the side of the operator's seat.

The work vehicle pertaining to the second aspect is the work vehicle pertaining to the first aspect, wherein the rotational axis is disposed ahead of the center in the forth and back direction of the console box disposed in the operating position.

When the rotational axis is thus disposed ahead of the center in the forth and back direction of the console box disposed in the operating position, when the console box has rotated, its front end moves only a small amount upward. Therefore, the console box is less likely to get in the way of the operator's ingress and egress when in its retracted position, making it easier for the operator to get in and out of the vehicle. Also, when the console box has rotated, its rear end moves only a small amount rearward. Therefore, it is easy for the operator to get in and out of the vehicle even if the inner wall of the cap is just behind the operator's seat.

The work vehicle pertaining to the third aspect is the work vehicle pertaining to the first or second aspect, further comprising an operation member and a transmission component. The operation member is disposed on the upper side near the front end of the console box. The transmission component is disposed facing the floor of the operator's seat from the lower side near the front end of the console box, and transmits the operation of the operation member to an operational object to be operated. The transmission component telescopes in and out along with rotation of the console box from the operating position to the retracted position, while rotating with its end on the floor side acting as the fulcrum.

Consequently, the console box connected to the transmission component for transmitting the operation of the operation member can be rotated to the rear.

Also, because the rotational axis is disposed ahead of the center in the forth and back direction of the console box disposed in the operating position, the transmission component and the rotational axis are both disposed toward the front of the console box, so there will be less change in the length of the transmission component accompanying rotation of the console box.

That is, since the position of the rotational axis of the console box is not the same as the position of the end serving as the rotational fulcrum of the transmission component in side view, when the transmission component rotates along with the rotation of the console box, the length of the transmission component changes. However, since both the transmission component and the rotational axis are disposed near the front of the console box, the amount of rotation of the transmission component accompanying rotation of the console box is reduced, so the change in the length of the transmission component can also be suppressed.

The work vehicle pertaining to the fourth aspect is the work vehicle pertaining to the third aspect, wherein the rotational axis is disposed within the rotation range of the transmission component in side view.

Also, disposing the rotational axis within the rotation range of the transmission component in side view allows the telescoping width of the telescoping part to be reduced.

The work vehicle pertaining to the fifth aspect is the work vehicle pertaining to the third aspect, wherein, in a state in which the console box is disposed in the operating position, the transmission component is disposed ahead of the rotational axis.

Thus disposing both the transmission component and the rotation shaft near the front of the console box allows and the telescoping width of the telescoping part to be further reduced.

The work vehicle pertaining to the sixth aspect is the work vehicle pertaining to the third aspect, comprising a front frame, a rear frame, a hydraulic actuator, and a control valve.

The hydraulic actuator is disposed from the front frame to the rear frame and changes the steering angle of the front frame with respect to the rear frame. The control valve controls the fluid supplied to the hydraulic actuator. The operation member is a joystick lever. The operational object is the control valve.

Thus, a console box provided with a joystick lever for controlling the steering angle can be rotated so that its front end moves far to the rear.

EFFECTS OF THE INVENTION

The present invention provides a work vehicle that is easier to get in and out of.

DETAILED DESCRIPTION OF EMBODIMENT(S)

The wheel loader in an embodiment pertaining to the present invention will now be described through reference to the drawings.

Embodiment 1

1. Configuration 1-1. Overview of Wheel Loader Configuration

Figure 1:
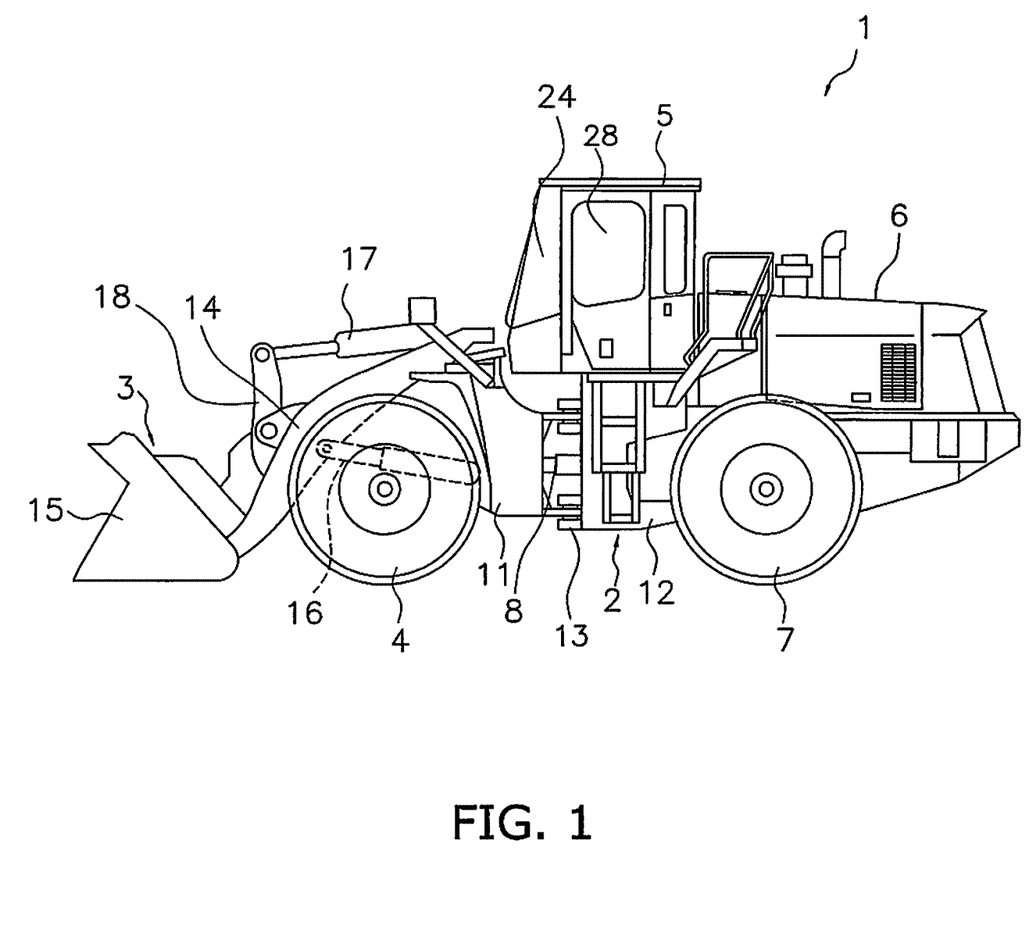
FIG. 1 is a side view of a wheel loader in an embodiment pertaining to the present invention.

FIG. 1 is a simplified diagram of the configuration of a wheel loader 1 in this embodiment. The wheel loader 1 in this embodiment mainly comprises a body frame 2, a work implement 3, a pair of front tires 4, a cab 5, an engine compartment 6, a pair of rear tires 7, and a pair of steering cylinders 8.

In this embodiment, the front, back, left, and right directions mean those directions as viewed by an operator seated in an operator's seat 30 (discussed below) in the cab 5.

The wheel loader 1 performs earth loading work and the like with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The steering cylinders 8 are disposed on the left and right sides in the vehicle width direction of the linking shaft 13, and are each attached from the front frame 11 to the rear frame 12. The flow of fluid supplied to the pair of steering cylinders 8 is changed to change the steering angle of the front frame 11 with respect to the rear frame 12 and to change the travel direction of the wheel loader 1.

The cab 5 is mounted on the rear frame 12, inside of which are disposed a steering wheel 37 or joystick lever 32 (discussed below; see FIG. 2) for steering, a lever for controlling the work implement 3, various display devices, and so forth. The engine compartment 6 is disposed on the rear frame 12 to the rear of the cab 5, and houses an engine.

1-2. Cab

Figure 2:
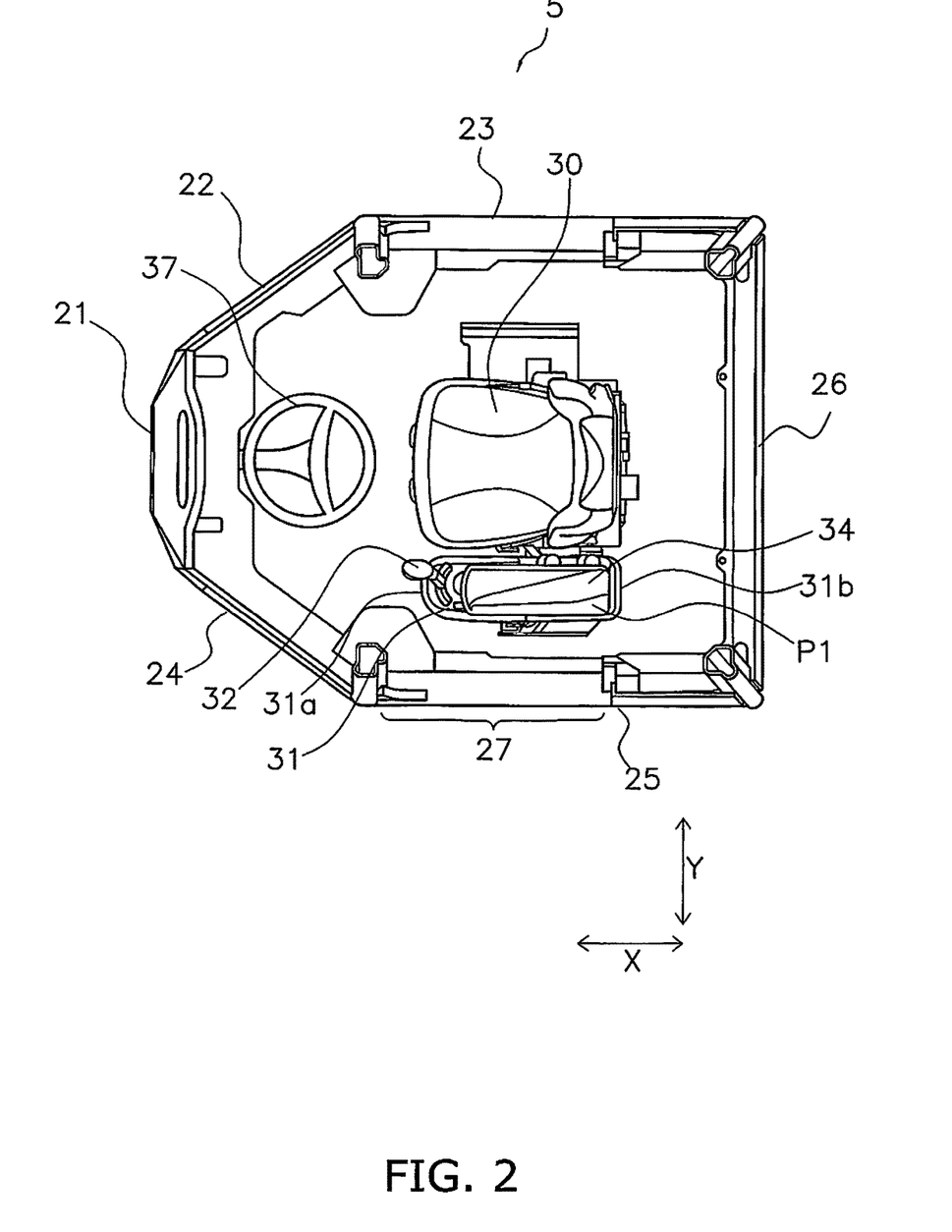
FIG. 2 is a top view of the configuration inside the cab in FIG. 1.
Figure 3:
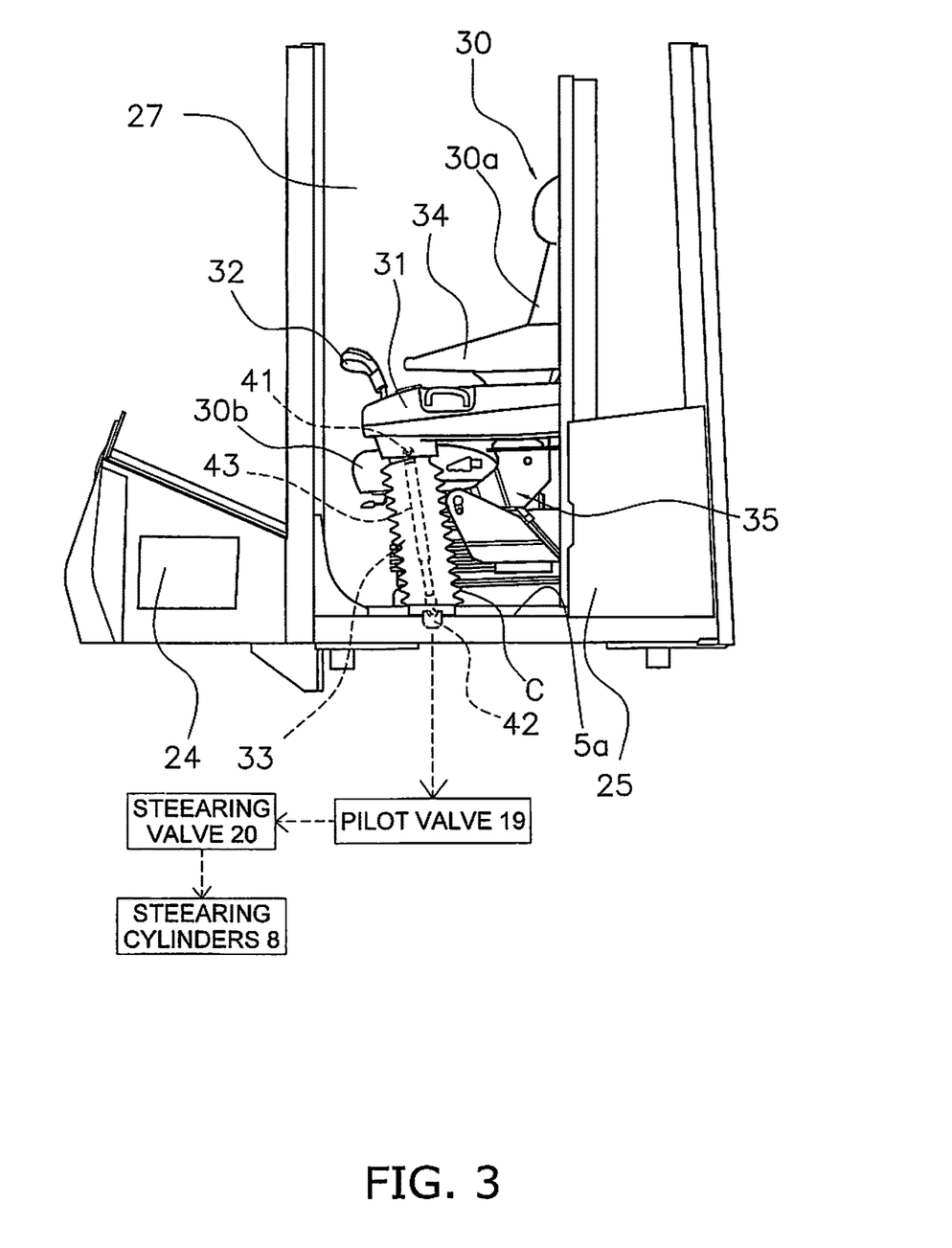
FIG. 3 is a left side view of FIG. 2.

FIG. 2 is a top view of the cab 5. FIG. 3 is a partial side view of the cab 5. As shown in FIG. 2, the cab 5 has a substantially hexagonal shape in top view, and has a front face 21, a right inclined face 22, a right side face 23, a left inclined face 24, a left side face 25, and a rear face 26. The front face 21 and the rear face 26 are parallel to each other and are each disposed along the left and right direction (see arrow Y in FIG. 2). The right side face 23 is disposed facing forward from the right end of the rear face 26. The right inclined face 22 is inclined with respect to the forth and back direction (see arrow X in FIG. 2), and is provided between the front end of the right side face 23 and the right end of the front face 21. The left side face 25 is disposed facing forward from the left end of the rear face 26. The left inclined face 24 is inclined with respect to the forth and back direction and is provided between the front end of the left side face 25 and the left end of the front face 21. The right inclined face 22 and the left inclined face 24 are disposed so that their spacing decreases toward the front. The right inclined face 22 and the left inclined face 24 are inclined in the forth and back direction in order to avoid interference with the front frame during steering.

A door opening 27 is formed at a position in front of the left side face 25, and the door 28 shown in FIG. 1 is provided to the door opening 27.

1-3. Internal Structure of Cab

Figures 4A, 4B:
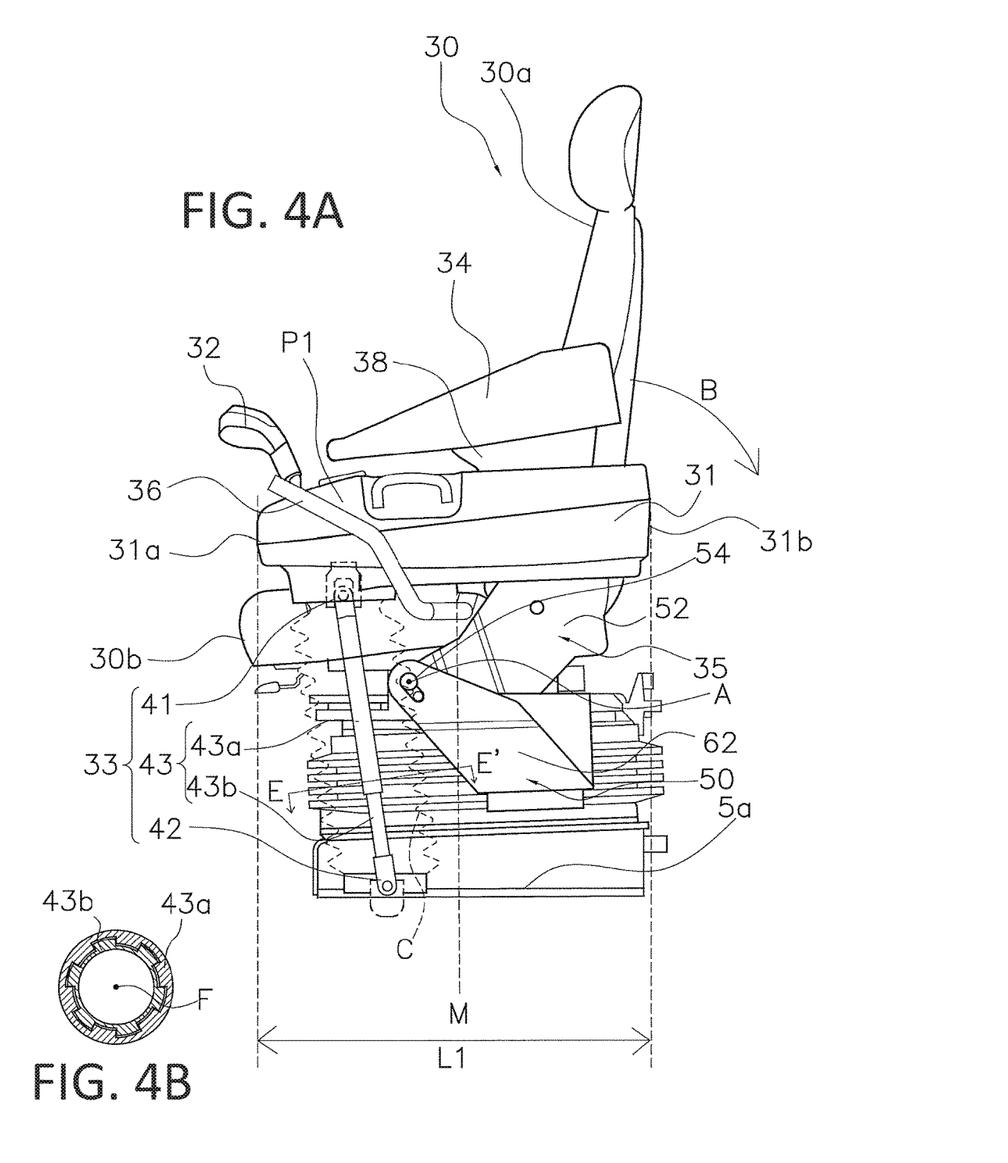
FIG. 4A is a side view of the state when the side face of the cab has been removed from FIG. 3.
FIG. 4B is a cross section along the EE' line in FIG. 4A.

FIG. 4A shows the state when the left side face 25 has been removed from FIG. 3.

The operator's seat 30, a console box 31, a joystick lever 32, a link 33, an armrest 34, a support 35, a rotation lever 36, the steering wheel 37 (see FIG. 2), and so forth are provided inside the cab 5.

(a) Operator's Seat, Steering Wheel

As shown in FIG. 2, the operator's seat 30 is disposed in the approximate center 1 it between the right side face 23 and the left side face 25. The operator's seat 30 is disposed at a position roughly facing the door opening 27. As shown in FIG. 4A, the operator's seat 30 has a backrest 30a, a seat bottom 30b, a lower frame 30c (discussed below; see FIG. 5) on the lower side of the seat bottom 30b, and so forth, and springs (not shown) are disposed on the lower side of the lower frame 30c.

The steering wheel 37 is operated by the operator when changing the steering angle of the front frame 11 with respect to the rear frame 12 during movement, for example. As shown in FIG. 2, the steering wheel 37 is disposed in front of the operator's seat 30 and between the right inclined face 22 and the left inclined face 24.

(b) Console Box

The console box 31 is disposed on the left lateral side of the operator's seat 30. The console box 31 can also be said to be disposed between the operator's seat 30 and the door opening 27. As shown in FIG. 4A, the console box 31 is formed longer in the forth and back direction, and is disposed substantially horizontally. A linking member (not shown) for linking the joystick lever 32 and the link 33 (discussed below) and the like are provided inside the console box 31. The position of the console box 31 disposed so as to be substantially horizontal as shown in FIG. 4A is an operating position P1. The operating position P1 is the position of the console box 31 when the operator is seated in the operator's seat 30 and operating the joystick lever 32.

(c) Joystick Lever

As shown in FIG. 4A, the joystick lever 32 is provided on the upper side near the front end 31a of the console box 31 so as to protrude upward.

The joystick lever 32 is used during work such as loading and conveying earth. The steering angle of the front frame 11 with respect to the rear frame 12 is changed by rotating the joystick lever 32 in the left and right direction.

(d) Link

The link 33 is a universal joint, and as shown in FIG. 4A includes a first joint 41, a second joint 42, and a telescoping part 43. The first joint 41 and the second joint 42 are disposed at both ends of the telescoping part 43. The telescoping part 43 is made up of an outer tube 43a and an inner tube 43b, and the outer tube 43a and the inner tube 43b are spline-coupled.

FIG. 4B is a cross section along the EE' line in FIG. 4A. As shown in FIG. 4B, tooth-like grooves are formed on the inner periphery of the outer tube 43a, and tooth-like grooves that mate with the tooth-like grooves in the outer tube 43a are formed on the outer periphery of the inner tube 43b. Also, the grooves are formed along the lengthwise direction. With this configuration, the outer tube 43a and the inner tube 43b are fixed to each other around the center axis F, and can transmit the operation of the joystick lever 32. The outer tube 43a and the inner cylinder 43b can move in the direction along the center axis F, allowing them to telescope.

The first joint 41 is attached to the lower side of the console box 31 and is linked to the joystick lever 32 by a linking member (not shown). The second joint 42 is inserted into and attached to the floor 5a of the cab 5.

The link 33 is covered with a cover C (see the dotted line).

Also, the second joint 42 of the link 33 is connected to a pilot valve 19 as shown in FIG. 3. The operation of the joystick lever 32 is transmitted to the pilot valve 19 via the link 33, and the pilot pressure inputted to a steering valve 20 is adjusted. The steering valve 20 adjusts the flow of the fluid supplied to the steering cylinder 8 according to the inputted pilot pressure. This allows steering to be performed by operating the joystick lever 32.

(e) Armrest

As shown in FIG. 4A, the armrest 34 is disposed on the upper side of the console box 31 via a bracket 38. The operator seated in the operator's seat 30 can rest his elbows on the armrest 34 in a state in which the console box 31 is disposed in the operating position P1.

(f) Support

Figure 5:
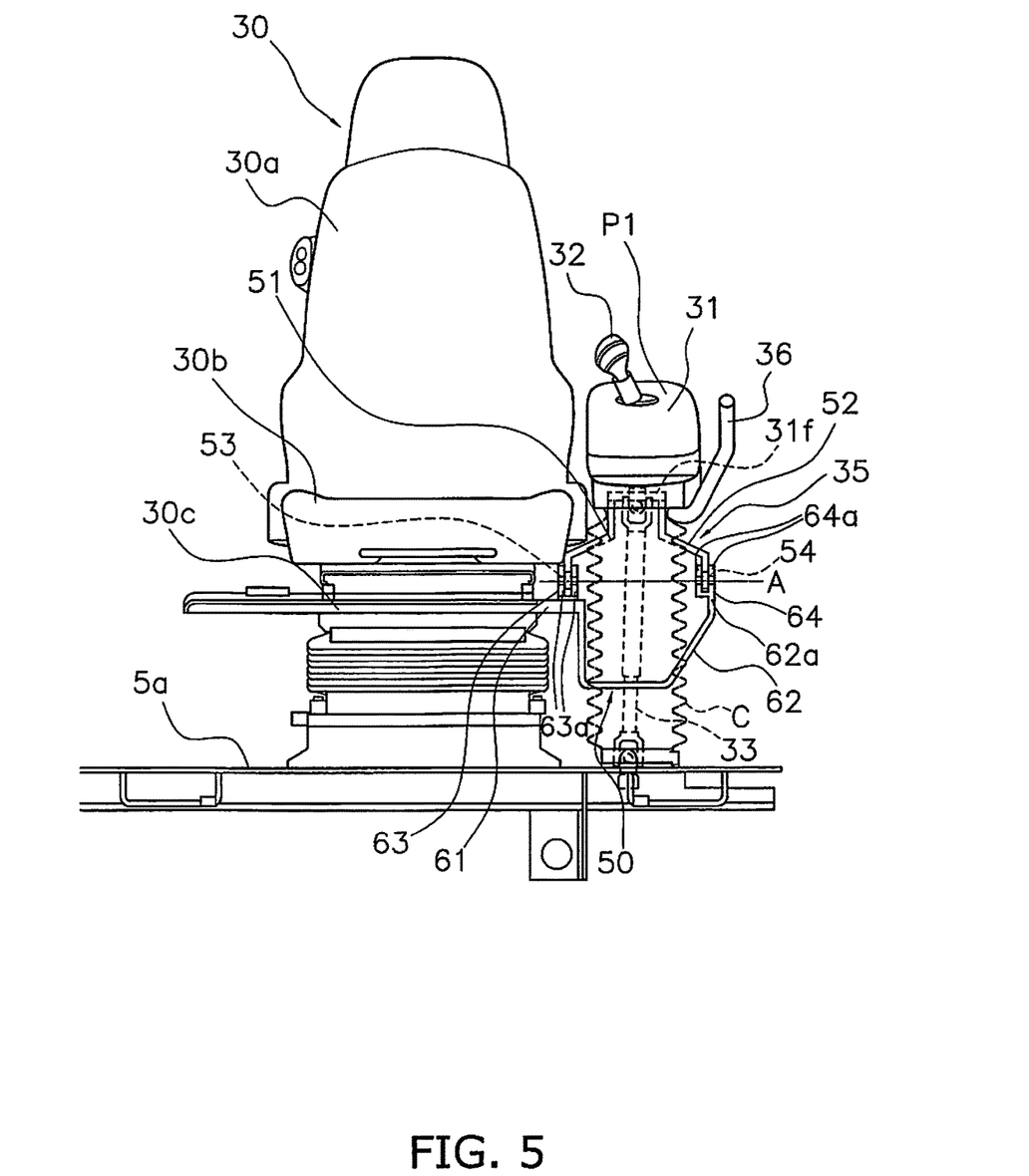
FIG. 5 is a front view of the internal configuration of the cab in FIG. 4A.

FIG. 5 is a view of the vicinity of the operator's seat 30 as seen from the front side. In FIG. 5, the link 33 and the cover C are in front of the support 35, but the support 35 is indicated by a solid line and the link 33 and the cover C are indicated by a dotted line for the sake of illustration.

The support 35 mainly has a fixing frame 50, a first rotation member 51, a second rotation member 52, a first shaft 53, and a second shaft 54.

As shown in FIG. 4A, the fixing frame 50 is disposed below the console box 31 and to the rear of the link 33. As shown in FIG. 5, the fixing frame 50 protrudes from the lower frame 30c of the operator's seat 30 toward the left side face. The fixing frame 50 has a first fixing portion 61, a second fixing portion 62, a first shaft support 63, and a second shaft support 64.

The first fixing portion 61 is connected to the lower frame 30c and is a portion that protrudes substantially horizontally from the lower frame 30c toward the left side face. The second fixing portion 62 is substantially U-shaped and is connected to the end on the left side face side of the first fixing portion 61. The first shaft support 63 is fixed to the upper side of the first fixing portion 61. The first shaft support 63 has two plate-like portions 63a disposed opposite each other with a predetermined spacing in the left and right direction. Holes are formed in the two plate-like portions 63a along the left and right direction. Inserting the first shaft 53 fixed to the first rotation member 51 (discussed below) into these holes allows the first shaft support 63 to rotatably support the first rotation member 51. The second shaft support 64 is provided on the upper end portion 62a on the left side face side of the second fixing portion 62. The second shaft support 64 has two plate-like portions 64a disposed opposite each other with a predetermined spacing in the left and right direction. Holes are formed in the two plate-like portions 64a along the left and right direction. Inserting the second shaft 54 fixed to the second rotation member 52 (discussed below) into these holes allows the second shaft support 64 to rotatably support the second rotation member 52.

The first rotation member 51 and the second rotation member 52 are each formed by bending a plate-like member, and are disposed opposite each other and aligned in the left and right direction, between the console box 31 and the fixing frame 50. The first rotation member 51 and the second rotation member 52 are formed by being bent so that the spacing between them is wider at the lower end than at the upper end.

The upper ends of the first rotation member 51 and the second rotation member 52 are fixed to the frame 31f of the console box 31. The lower end of the first rotation member 51 is inserted between the two plate-like portions 63a of the first shaft support 63. The lower end of the second rotation member 52 is inserted into the two plate-like portions 64 a of the second shaft support 64.

The first shaft 53 is fixed to the lower end of the first rotation member 51. The first rotation member 51 protrudes downward in the right and left direction. The first shaft 53 is inserted into the holes in the plate-like portions 63a of the first shaft support 63. The second shaft 54 is fixed to the lower end of the second rotation member 52. The second rotation member 52 protrudes downward in the right and left direction. The second shaft 54 is inserted into the holes of the plate-like portions 64a of the second shaft support 64. The first shaft 53 and the second shaft 54 are disposed coaxially along the left and right direction.

The first rotation member 51 and the second rotation member 52 can rotate relative to the fixed frame 50 around the first shaft 53 and the second shaft 54. Also, the first rotation member 51 and the second rotation member 52 are fixed to the lower frame 30c of the console box 31. Therefore, the console box 31 is also rotated by the rotation of the first rotation member 51 and the second rotation member 52.

The rotational axis A of the console box 31 is the center of the first shaft 53 and the second shaft 54, and is shown in FIG. 4A and FIG. 5. As shown in FIG. 4A, the rotational axis A is disposed on the lower side of the console box 31, ahead of the center (see the line M) between the front end 31a and the rear end 31b of the console box 31.

(g) Rotating Lever

The rotation lever 36 is grasped by the operator when the console box 31 is to be rotated.

Figure 6:
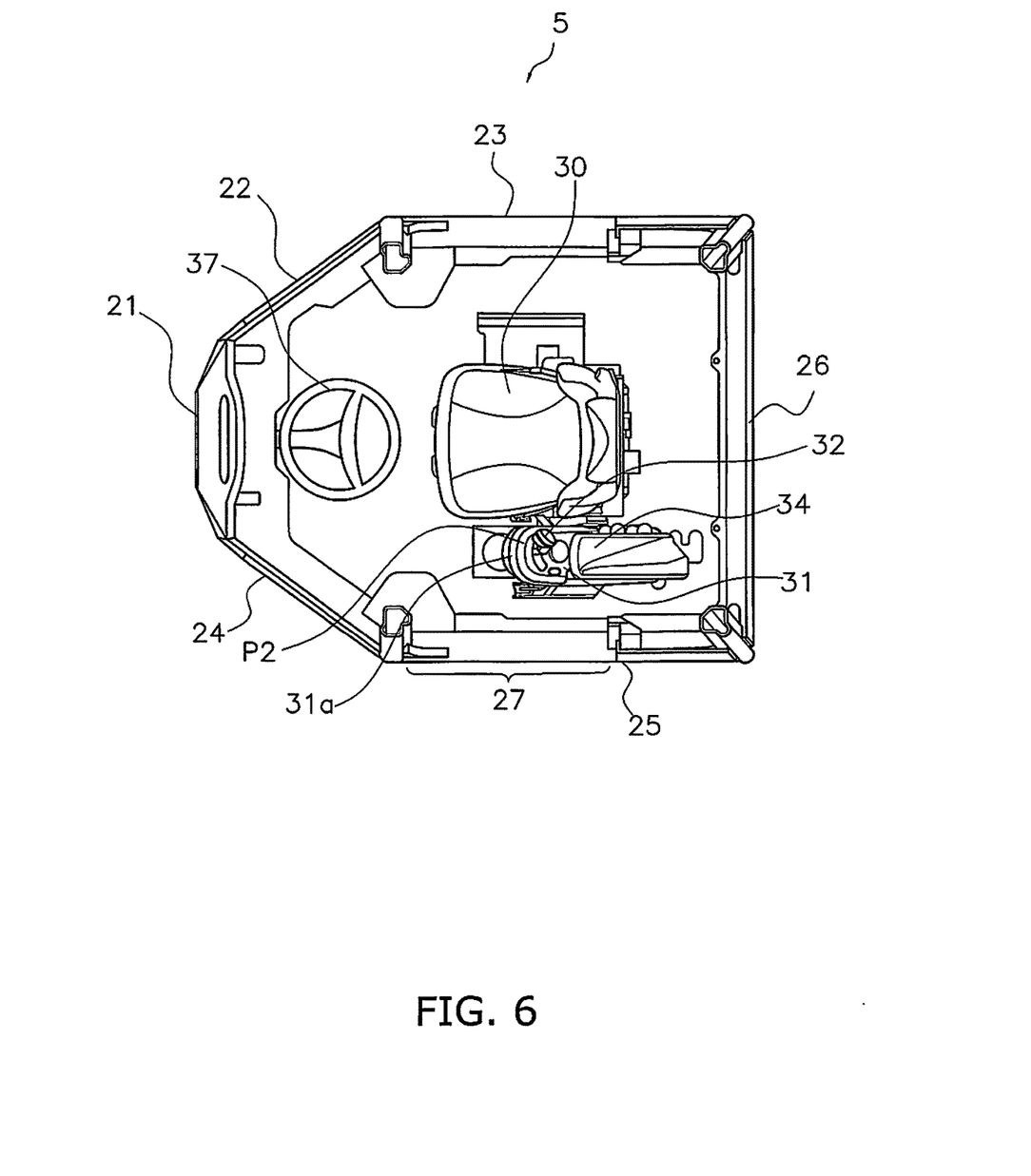
FIG. 6 is a top view of the state when the console box has been rotated rearward from the state in FIG. 2.
Figure 7:
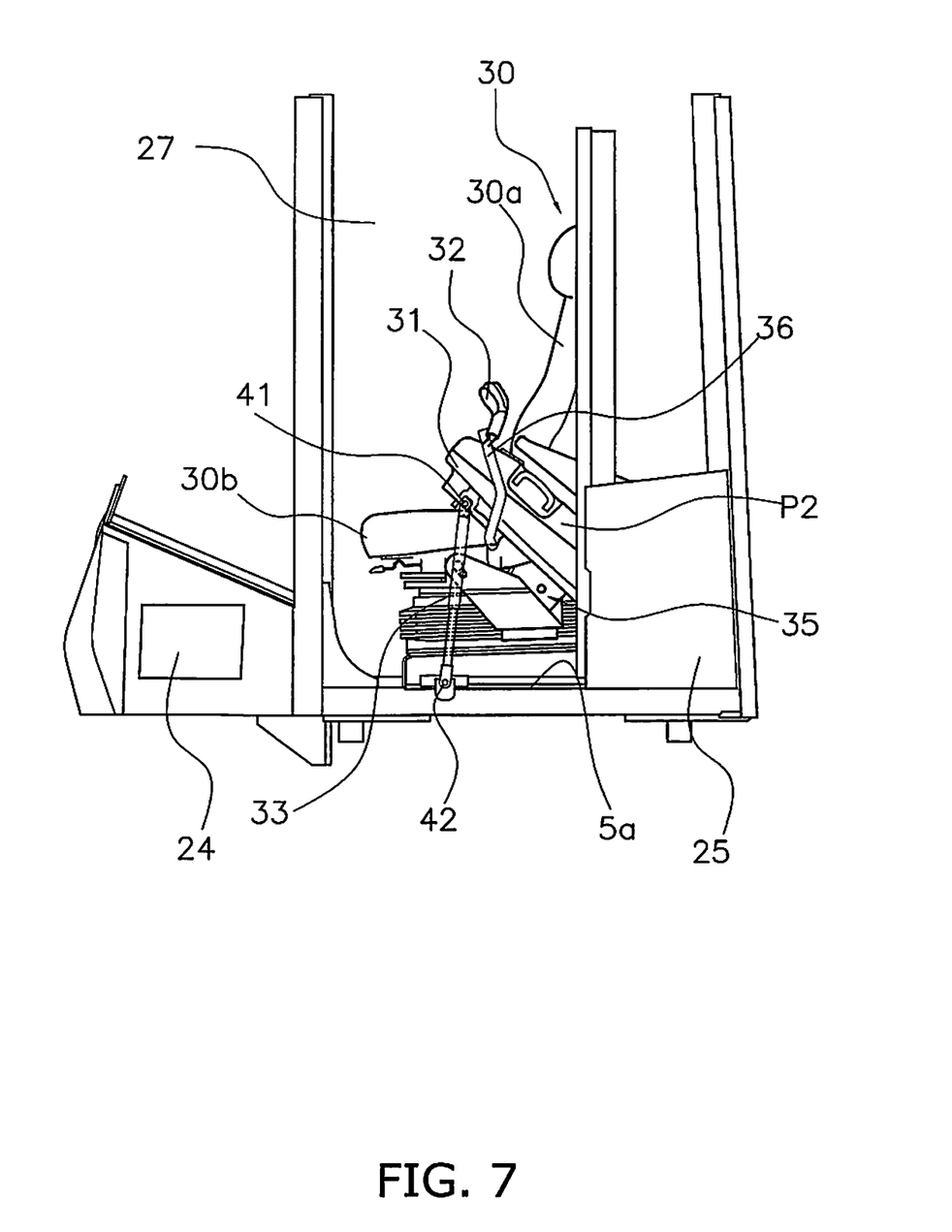
FIG. 7 is a left side view of FIG. 6.
Figure 8:
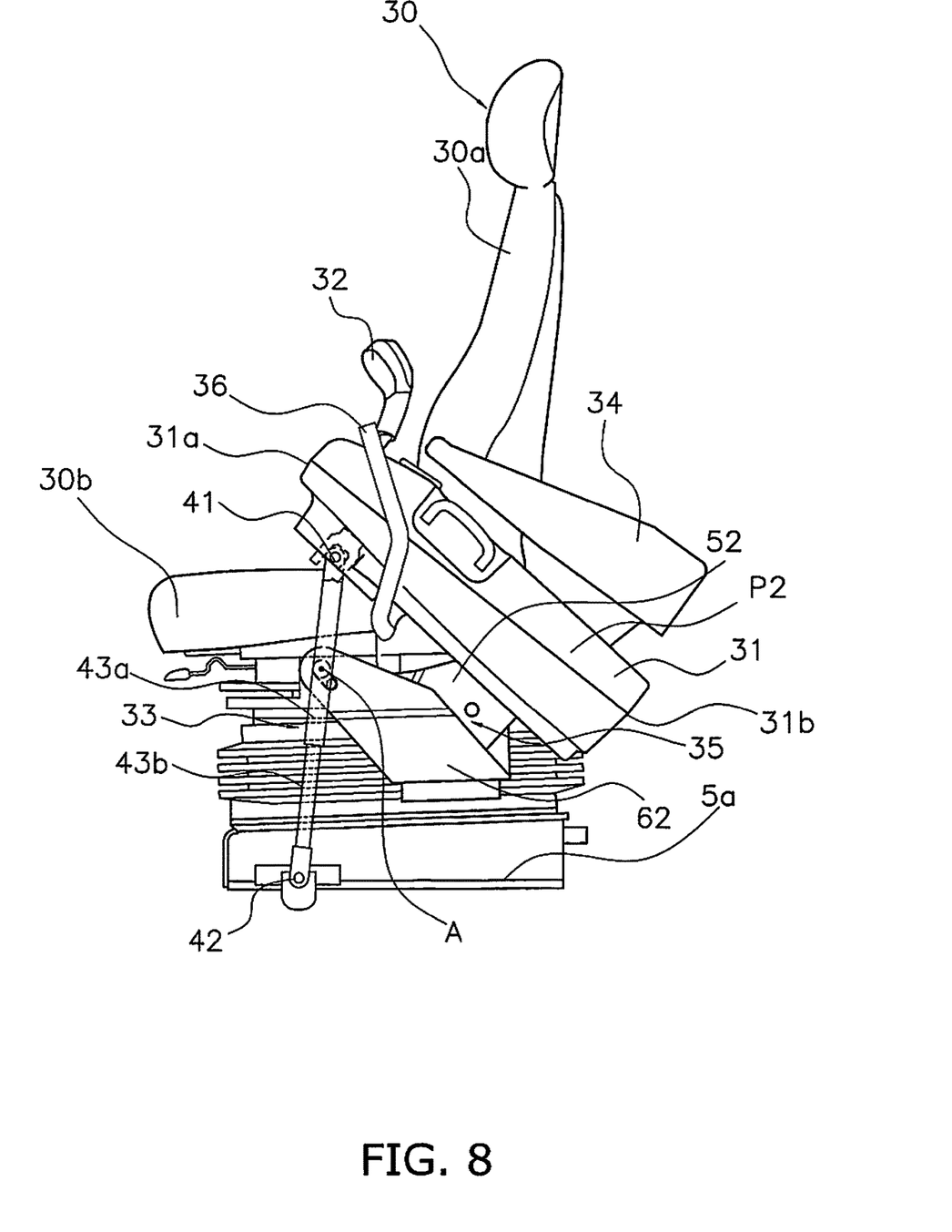
FIG. 8 is a side view of the state when the side face of the cab has been removed from FIG. 7.

The rotation lever 36 is connected to the lower side of the console box 31. When the operator grips the rotation lever 36 and rotates it rearward, the console box 31 rotates rearward as shown in FIGS. 6 to 8 (discussed below).

2. Rotating Motion

Next, the rotation operation of the console box 31 of the wheel loader 1 in an embodiment pertaining to the present invention will be described.

The console box 31 shown in FIG. 4A and FIG. 5 is disposed substantially horizontally, and is disposed at the operating position P1 where the operator operates the joystick lever 32. When the operator grips the rotation lever 36 from this state and rotates it rearward as indicated by the arrow B in FIG. 4A, the console box 31 is disposed in a retracted position P2. The console box 31 may be locked in either the operating position P1 or the retracted position P2.

FIG. 6 is a top view of the state when the console box 31 is disposed in the retracted position P2. FIG. 7 is a left side view of FIG. 6. FIG. 8 shows the state when the left side face 55 of the cab 5 has been removed from FIG. 7.

As shown in FIGS. 6 to 8, the console box 31 is disposed in the retracted position P2 that is moved rearward (the direction of the arrow B in FIG. 4A) around the rotation axis A from the operating position P1.

In the operating position P1, the console box 31 is disposed substantially horizontally, with its front end 31a and rear end 31b at substantially the same height, as shown in FIG. 4A. On the other hand, as shown in FIG. 8, in the retracted position P2, the console box 31 is disposed at an angle. More precisely, the rear end 31b of the console box 31 is located lower than the front end 31a.

Figure 9:
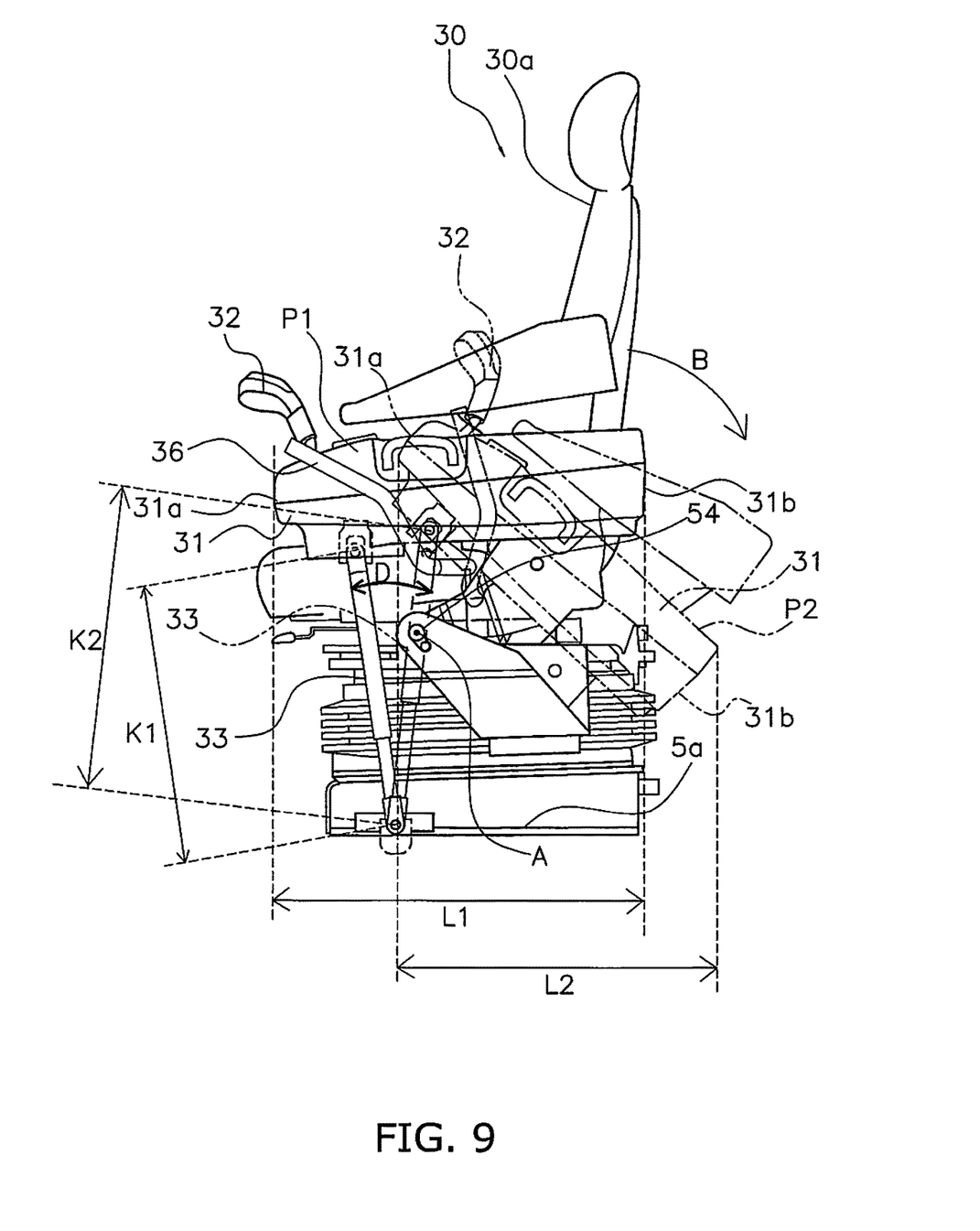
FIG. 9 is a side view of the state when the console box is disposed in the operating position and in the retracted position.

FIG. 9 shows the console box 31 in its operating position P1 and its retracted position P2. In FIG. 9, the console box 31 in the retracted position P2 is indicated by a two-dot chain line. As shown in FIG. 9, the distance L2 in the horizontal direction from the front end 31a to the rear end 31b of the console box 31 in the retracted position P2 is shorter than the distance L1 in the horizontal direction from the front end 31a to the rear end 31b of the console box 31 in the operating position P1. To put this another way, in top view, the spacing L2 between the front end 31a and the rear end 31b of the console box 31 in the retracted position P2 is shorter than the spacing L1 between the front end 31a and the rear end 31b of the console box 31 at the operating position P1.

Also, the first joint 41 side of the link 33 rotates around the second joint 42 along with rotation of the console box 31. Here, since the first joint 41 rotates around the rotational axis A, the outer tube 43a moves upward with respect to the inner tube 43b, and the telescoping part 43 extends. That is, as shown in FIG. 9, the length K2 of the link 33 in a state in which the console box 31 is in the retracted position P2 is greater than the length K1 of the link 33 in a state in which the console box 31 is in the operating position P1.

Further, as shown in FIG. 9, the rotational axis A is provided within the rotation range D of the link 33 in side view.

After thus rotating the console box 31 rearward, the operator gets in or out of the wheel loader 1 through the door opening 27.

As shown in FIGS. 6 and 7, the console box 31 can be retracted from the front end left side of the seat bottom 30b of the operator's seat 30 by rotating the console box 31 rearward, as compared with FIGS. 2 and 3. That is, since a space can be ensured on the left side of the front end of the seat bottom 30b of the operator's seat 30, the operator can easily get in or out of the vehicle through the door opening 27 formed on the left side of the operator's seat 30.

3. Features, etc.

3-1

The console box 31 and the support 35 are provided inside the cab 5 of the wheel loader 1 (an example of a work vehicle) of this embodiment. The console box 31 is disposed to the side of the operator's seat 30 and is configured to be rotatable in the forth and back direction. The support 35 has a rotational axis A disposed below the console box 31 along the left and right direction, and supports the console box 31 rotatably about the rotational axis A, between the operating position P1 in which the console box 31 is disposed horizontally and the retracted position P2 in which it is inclined at a position rotated rearward from the operating position P1. As shown in FIG. 9, the spacing L2 in the horizontal direction between the front end 31a and rear end 31b of the console box 31 is disposed in the retracted position P2 is shorter than the spacing L1 in the horizontal direction between the front end 31a and rear end 31b of the console box 31 is disposed in the operating position P1.

Thus rotating the console box 31 rearward so that the spacing L2 is shorter than the spacing L1 allows the front end 31a of the console box 31 to move far to the rear. Therefore, as shown in FIGS. 6 and 7, even if the door opening 27 is located to the side of the operator's seat 30, the operator can easily get in and out.

3-2

With the wheel loader 1 (an example of a work vehicle) in this embodiment, the rotational axis A is disposed ahead of the center in the forth and back direction of the console box 31 disposed in the operating position P1, as shown in FIG. 4A.

Because the rotational axis A is thus disposed ahead of the center (see the line M shown in FIG. 4A) in the forth and back direction of the console box 31 disposed in the operating position P1, when the console box when 31 is rotated, its front end 31a moves upward only a small amount. Therefore, the console box 31 is less likely to hinder the ingress or egress of the operator in the retracted position P2, making it easier for the operator to get in and out. Also, when the console box 31 is rotated, its rear end 31b moves rearward only a small amount. Therefore, even if the rear face 26 of the cab 5 is just behind the operator's seat 30, the operator can still get in and out with ease.

3-3

As shown in FIG. 4A, the joystick lever 32 (an example of an operation member) and the link 33 (an example of a transmission component) are further provided inside the cab 5 of the wheel loader 1 (an example of a work vehicle) in this embodiment. The joystick lever 32 is disposed on the upper side near the front end 31a of the console box 31. The link 33 is disposed facing the floor 5a of the operator's seat 30 from the lower side near the front end 31a of the console box 31, and transmits the operation by the joystick lever 32 to the pilot valve 19 (an example of an operational object to be operated). The link 33 rotates with the second joint 42 (an example of the end on the floor side) as its fulcrum, while telescoping in or out as the console box 31 rotates from its operating position P1 to its retracted position P2.

This allows the console box 31, to which is connected the link 33 for transmitting the operation of the joystick lever 32, to rotate to the rear.

Also, since the link 33 and the rotational axis A are both disposed toward the front of the console box 31, so there will be less change in the length of the link 33 accompanying rotation of the console box 31.

Specifically, in side view, since the position of the rotational axis A of the console box 31 is not the same as the position of the second joint 42, which is the pivot point of the link 33, when the link 31 rotates along with the rotation of the console box 31, the length of the link 31 changes. However, since the link 33 and the rotational axis A are both disposed toward the front of the console box 31, the amount of rotation of the link 33 accompanying rotation of the console box 31 is reduced, so the change in the length of the link 33 can also be suppressed.

3-4

With the wheel loader 1 in this embodiment, as shown in FIG. 9, the rotational axis A is disposed within the rotation range D of the link 33 (an example transmission component) in side view.

Also, the telescoping width of the telescoping part 43 can be further reduced by disposing the rotational axis A within the rotation range D of the link 33 in side view.

3-5

With the wheel loader 1 in this embodiment, in a state in which the console box 31 is disposed in the operating position P1, the link 33 (an example of a transmission component) is disposed ahead of the rotational axis A.

Thus disposing both the link 33 and the rotational axis A toward the front of the console box 31 allows the telescoping width of the telescoping part 43 to be further reduced.

3-6

The wheel loader 1 in this embodiment comprises the front frame 11, the rear frame 12, the steering cylinder 8 (an example of a hydraulic actuator), and the pilot valve 19 (an example of a control valve). The steering cylinder 8 is disposed from the front frame 11 to the rear frame 12, and changes the steering angle of the front frame 11 with respect to the rear frame 12. The pilot valve 19 controls the fluid supplied to the steering cylinders 8.

This allows the console box 31, to which is provided the joystick lever 32 used for varying the steering angle, to be rotated so that its front end 31a moves far to the rear.

Other Embodiments

An embodiment of the present invention was described above, but the present invention is not limited to or by the above embodiment, and various modifications are possible without departing from the gist of the invention.

(A)

With the wheel loader 1 in the above embodiment, the joystick lever 32 of the console box 31 was provided as an example of an operation member, but the joystick lever 32 is not the only option. Furthermore, the operation member itself need not be provided, and the configuration of this embodiment is applicable as long as the console box 31 is provided beside the operator's seat 30.

(B)

With the wheel loader 1 in the above embodiment, the link 33 is provided and the operation of the joystick lever 32 is transmitted mechanically to the pilot valve 19, but the configuration may be such that no the link 33 is provided and the transmission is electrical. In this case, the transmission may be performed either wirelessly or by wire.

(C)

With the wheel loader 1 in the above embodiment, the pilot valve 19 is provided as an example of an operational object to be operated, but the pilot valve 19 is not the only option. For instance, the configuration may be such that no pilot valve 19 is provided, the link 33 is connected to the steering valve 20 (an example of an operational object to be operated), and the steering valve 20 is operated directly by the joystick lever 32.

(D)

In the above embodiment, the armrest 34 was provided on the upper side of the console box 31, but the armrest 34 may not be provided. Also, as shown in FIGS. 8 and 9, the rear end of the armrest 34 protrudes rearward from the rear end 31b of the console box 31, but the armrest 34 may be formed so as not to protrude.

(E)

In the above embodiment, a wheel loader was described as an example of a work vehicle, but the work vehicle may be a dump truck, a hydraulic excavator, or the like instead.

(F)

In the above embodiment the wheel loader 1 was described as an example of a work vehicle, and the steering wheel 37 was disposed in the cab 5, but depending on the work vehicle, there may be no steering wheel 37.

INDUSTRIAL APPLICABILITY

The work vehicle pertaining to the present invention affords easy ingress and egress, and is widely applicable to various kinds of work vehicles such as a wheel loader.

The invention claimed is:

1. A work vehicle, comprising:
   a console box disposed to a side of an operator's seat, the console box being configured to be rotatable in a forth and back direction; and
   a support including a rotational axis disposed in a left and right direction below the console box, the support rotatably supporting the console box around the rotational axis and between
   an operating position and
   a retracted position in which the console box has been rotated from the operating position,
   a spacing in a horizontal direction between front and rear ends of the console box disposed in the retracted position being less than a spacing in the horizontal direction between front and rear ends of the console box disposed in the operating position
   the rotational axis is disposed ahead of a center in the forth and back direction of the console box disposed in the operating position.

2. The work vehicle according to claim 1, wherein
   the console box is horizontally disposed when the console box is in the operating position, and
   the console box is rotated rearward so as to be inclined when the console box is in the retracted position.

3. A work vehicle, comprising:
   a console box disposed to a side of an operator's seat, the console box being configured to be rotatable in a forth and back direction;

a support including a rotational axis disposed in a left and right direction below the console box, the support rotatably supporting the console box around the rotational axis and between
  an operating position in which the console box is horizontally disposed and
  a retracted position in which the console box is inclined at a position in which the console box has been rotated rearward from the operating position;
an operation member disposed on an upper side near the front end of the console box; and
a transmission component disposed facing a floor of the operator's seat from a lower side near the front end of the console box, the transmission component being configured to transmit an operation of the operation member to an operational object to be operated,
a spacing in a horizontal direction between front and rear ends of the console box disposed in the retracted position being less than a spacing in the horizontal direction between front and rear ends of the console box disposed in the operating position,
the transmission component telescoping in and out along with rotation of the console box from the operating position to the retracted position, while rotating with an end of the transmission component on a floor side acting as a fulcrum.

4. The work vehicle according to claim 3, wherein
the rotational axis is disposed within a rotation range of the transmission component as viewed in side view.

5. The work vehicle according to claim 3, wherein
in a state in which the console box is disposed in the operating position, the transmission component is disposed in front of the rotational axis.

6. The work vehicle according to claim 3, further comprising:
a front frame;
a rear frame;
a hydraulic actuator disposed from the front frame to the rear frame, the hydraulic actuator being configured to change a steering angle of the front frame with respect to the rear frame; and
a control valve configured to control fluid supplied to the hydraulic actuator,
the operation member being a joystick lever, and
the operational object being the control valve.

* * * * *